E. COOK.
AUTOMOBILE HEADLIGHT.
APPLICATION FILED AUG. 10, 1917.

1,286,170.

Patented Nov. 26, 1918.

INVENTOR
E. Cook.
BY Victor J. Evans
ATTORNEY

WITNESSES

UNITED STATES PATENT OFFICE.

EDWARD COOK, OF REPUBLIC, WASHINGTON.

AUTOMOBILE-HEADLIGHT.

1,286,170.   Specification of Letters Patent.   Patented Nov. 26, 1918.

Application filed August 10, 1917. Serial No. 185,591.

*To all whom it may concern:*

Be it known that I, EDWARD COOK, a citizen of the United States, residing at Republic, in the county of Ferry and State of Washington, have invented new and useful Improvements in Automobile-Headlights, of which the following is a specification.

This invention relates to vehicle headlights and is especially designed for use in connection with motor vehicles.

The primary object of the invention is to provide a headlight in which the rays of light will be directed not only for some distance in advance of the vehicle, but for an appreciable distance upon each side thereof, thereby affording the driver a clear view of the road in all directions, which is especially desirable in traveling over dark country roads or in making turns, the light affording the driver a full view of either side of the road and enabling him to avoid possible ruts and ditches.

Another object of the invention is to provide means for preventing the glare of the light from interfering with the driver of the vehicle to which it is applied, or to other vehicles, the said means serving to arrest the upward travel of the rays of light, so that they do not reach a height sufficient to cause annoyance.

The invention therefore contemplates the provision of a headlight in which the light or bulb extends beyond the plane of the front of the lamp, the glass being formed to permit of this extension and the lamp being further provided with a reflector positioned so as to direct the rays of light down and at each side of the lamp.

Figure 1:
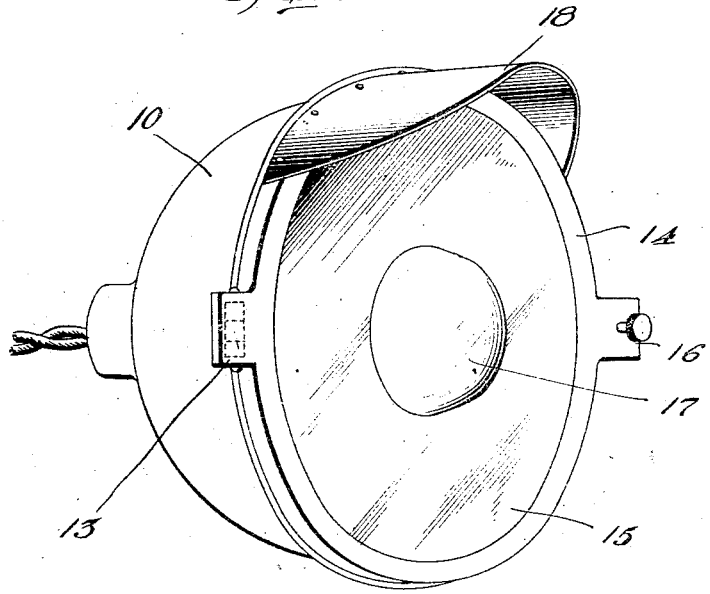
Figure 1 is a perspective view of a vehicle headlight constructed in accordance with the present invention.
Figure 2:
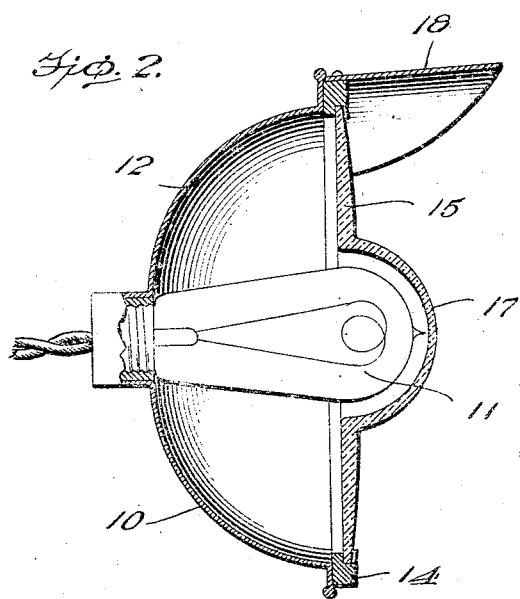
Fig. 2 is a vertical central sectional view of the same.

Referring to the drawings in detail, in which like characters of reference denote corresponding parts, the improved headlight consists of a casing 10 of any ordinary or preferred construction, the said casing having located therein a suitable source of light 11, which in the present instance is shown as an electric bulb, but it is of course obvious that an acetylene or other light may be substituted. The interior walls of the casing are finished to provide the usual reflector 12, which serves to project the rays of light for some distance in front of the lamp.

Hingedly secured to the lamp casing 10 as shown at 13, is a frame 14, which is designed to carry a glass 15, that portion of the frame diametrically opposite the hinge 13 being provided with a suitable latch 16, so that the frame 14 of the glass 15 provides a hinged door for the front of the casing 10.

The lamp 11 is so positioned within the casing that it will project for some distance beyond the plane of the front of the casing and in order to provide for this projecting portion of the lamp, the glass 15 is formed with a pocket 17, which is positioned concentrically thereof and is adapted to receive the forward projecting end of the lamp 11.

By this means the rays of light are not only projected some distance in advance of the lamp, but also project upon all sides of the same, the lamp projecting beyond the plane of the front of the glass there being nothing to interfere with the travel of the rays in a lateral direction.

For the purpose of preventing the upward travel of the rays of light, so that they will not interfere with the driver of the vehicle to which the lamp may be attached, or to other vehicles or pedestrians, the frame 14 of the lamp carries a hood or deflector 18, which is positioned directly above the lamp and extends for some distance upon either side of the vertical center of the casing, so that the rays of light are deflected downwardly and upon either side of the vertical diameter of the casing. The deflector 18 may be separately formed and secured to the frame 14, or it may be made integral therewith as desired.

It is believed from the foregoing that the construction and advantages of the invention will be apparent and that a further description is unnecessary. The right is reserved to make such changes as may fall within the scope of the claim hereto appended.

Having described the invention, what is claimed is:

A lamp embodying a casing, a lens having a substantially flat face secured to said casing, a pocket formed in the face of the lens and projecting outwardly therefrom, a source of light within said casing, said source of light projecting beyond the face of the lens into said pocket, whereby the rays of light will be projected in front of and to each side of the lamp and a deflector projecting beyond said casing through the projecting end of the source of light.

In testimony whereof I affix my signature.

EDWARD COOK.